US007587590B2

(12) United States Patent
Yamada et al.

(10) Patent No.: US 7,587,590 B2
(45) Date of Patent: Sep. 8, 2009

(54) ENCRYPTED COMMUNICATION APPARATUS

(75) Inventors: Keiki Yamada, Tokyo (JP); Tsuneo Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 762 days.

(21) Appl. No.: 10/451,826

(22) PCT Filed: Oct. 24, 2002

(86) PCT No.: PCT/JP02/11050

§ 371 (c)(1),
(2), (4) Date: Jun. 26, 2003

(87) PCT Pub. No.: WO03/039066

PCT Pub. Date: May 8, 2003

(65) Prior Publication Data

US 2004/0059908 A1    Mar. 25, 2004

(30) Foreign Application Priority Data

Oct. 29, 2001    (JP)    ............................ 2001-330190

(51) Int. Cl.
*H04L 9/36*    (2006.01)
(52) U.S. Cl. ..................... 713/161; 713/153; 380/1
(58) Field of Classification Search ................. 380/1
See application file for complete search history.

(56) References Cited

U.S. PATENT DOCUMENTS 5,524,116 A * 6/1996 Kalmanek et al. ........... 714/799
6,118,873 A * 9/2000 Lotspiech et al. ........... 380/277
6,804,782 B1 * 10/2004 Qiu et al. .................... 713/194
6,910,133 B1 * 6/2005 Cohn .......................... 713/190
2002/0191785 A1 * 12/2002 McBrearty et al. ........... 380/37

FOREIGN PATENT DOCUMENTS

JP    61-17175 A    1/1986
JP    03-139717 A    6/1991

(Continued)

OTHER PUBLICATIONS

Wang, "On the Hardware Design for DES Cipher in Tamper Resistant Devices against Different Fault Analysis," ISCAS 2000—IEEE International Symposium on Circuits and Systems, pp. 697-700, May 2000.

(Continued)

*Primary Examiner*—Matthew B Smithers
*Assistant Examiner*—David J Pearson
(74) *Attorney, Agent, or Firm*—Birch, Stewart, Kolasch & Birch, LLP

(57) ABSTRACT

This invention relates to an encryption communication apparatus using encryption processing. It is an object of this invention to obtain the encryption communication apparatus with excellent tamper-resistance while ensuring sufficient securities. A communicating unit 1 sends and receives communication data including a length field and a data field. A length comparing unit 6 compares a value of the length field and a minimum length value stored in the apparatus in advance. When it is judged that the value of the length field is less than the minimum length value, a controlling unit 7 controls an encryption processing unit 5 not to perform encryption processing or decryption processing of the data in the data field.

12 Claims, 9 Drawing Sheets

FOREIGN PATENT DOCUMENTS

| | | |
|---|---|---|
| JP | 3-139717 A | 6/1991 |
| JP | 10-154976 A | 6/1998 |
| JP | 11-145950 A | 5/1999 |
| JP | 2000-182102 A | 6/2000 |

OTHER PUBLICATIONS

Karri et al., "Concurrent Error Detection of Fault-Based Side-Channel Cryptanalysis of 128-Bit Symmetric Block Ciphers," Proceedings of the Design Automation Conference, pp. 579-584, Jun. 2001.

* cited by examiner

Fig. 6

EXAMPLE OF CORRESPONDENCE TABLE OF COMMAND AND MINIMUM LENGTH VALUE

| COMMAND | MINIMUM LENGTH VALUE |
|---|---|
| 10 | 24 |
| 12 | 16 |
| 14 | 8 |
| ⋮ | ⋮ |
| 255 | 128 |

Fig. 7

EXAMPLE OF CORRESPONDENCE TABLE OF COMMUNICATION TRANSACTION AND MINIMUM LENGTH VALUE

| TRANSACTION ORDER OF COMMUNICATION | MINIMUM LENGTH VALUE |
|---|---|
| 1 | 24 |
| 2 | 32 |
| 3 | 128 |
| ⋮ | ⋮ |
| 10 | 8 |

ENCRYPTED COMMUNICATION APPARATUS

TECHNICAL FIELD

This invention relates to an apparatus for improving difficulty (tamper-resistance) in reading out confidential information in an encryption communication apparatus.

BACKGROUND ART

In an encryption communication field, many authenticating methods are proposed. Normally, authentication is performed (by a verifier) by verifying identity of a person who knows certain confidential information. For example, in an authenticating method according to the related art, disclosed in Japanese Unexamined Patent Publication HEI 2000-182102, both A (an encryption communication apparatus in a certifier side) and B (an encryption communication apparatus in a verifier side) held a common key in advance and authenticated each other through following procedures.

(1) A generates a random number R1, and sends the random number R1 to B.

(2) B generates an authentication code 1 from the random number R1 and the common key. B also generates a random number R2. Then, B sends the authentication code 1 and the random number R2 to A.

(3) A generates an authentication code from the random number R1 and the common key, and checks if the authentication code is identical with the authentication code 1 received from B. (Accordingly, A authenticates B.)

(4) Next, A generates an authentication code 2 from the random number R2 and the common key, and sends the authentication code 2 to B.

(5) B generates an authentication code from the random number R2 and the common key, and checks if the authentication code is identical with the authentication code 2 received from A. (Accordingly, B authenticates A.)

Further, an authenticating method that a plurality of information is held respectively to generate a common key (secret key), the common key (secret key) is not shared, and the common key (secret key) is generated at a time of authenticating or a time of sharing the key is also disclosed. Further, an encryption authenticating method (Fiat-Shamir method, etc.) based on zero knowledge proof technique and a method (a public key encryption method) using two asymmetric data cryptographic keys, i.e., a public key and a secret key, that is a method of encrypting using the public key (or secret key) and decrypting using the secret key (or public key) are also used in various apparatuses.

Normally, the tamper-resistance for making easy read-out impossible has been realized by storing confidential information (key, etc. used for encryption processing) in a nonvolatile memory and controlling an access to this by a microprocessor. For example, in a plurality of encryption communication apparatuses including a base station in a mobile commerce system, a cellular phone and a smart card, etc., or a plurality of encryption communication apparatuses including a roadside machine in a non-stop automatic toll receiving system and an on-board equipment in vehicle and a smart card, etc., accessing is performed in a method of sending (or receiving) a determined command and receiving (or sending) a response for this.

Such command and response are transmitted through a communication line between the encryption communication apparatuses. However, since it is relatively easy to access the communication line from an outside, there is a high possibility that data transmitted on the communication line are monitored from the outside or false data are inserted intentionally.

Further, since various analysis/attack methods, e.g., failure analysis, timing analysis, electric power analysis, etc. have been proposed in recent years, an opinion that it is impossible to read out the confidential information in the nonvolatile memory is becoming wrong.

In the above-stated encryption communication apparatuses according to the related art, when an operation (or processing or conversion) is performed using the confidential information, information, e.g., waveform of electric power, processing time, etc. which is useful for an attacker leaks to the outside. Therefore, there has been a problem that it is impossible to ensure sufficient security against masquerading, tampering, eavesdropping on the communication line, etc.

Further, since measures with respect to flow of information in the encryption communication apparatus have not been sufficient, there has been a problem that a chance of attack, e.g., cryptanalysis, etc. increases, and consequently damage due to forgery increases.

This invention is intended to solve the above-stated problems. It is an object to obtain an encryption communication apparatus with excellent tamper-resistance while ensuring the sufficient security.

DISCLOSURE OF THE INVENTION

An encryption communication apparatus concerning this invention has a characteristic of including following elements:

(1) a communicating unit for sending and receiving communication data including at least a length field and a data field;

(2) an encryption processing unit for performing encryption processing or decryption processing of data in the data field in the communication data;

(3) a length comparing unit for comparing a value of the length field in the communication data received and a minimum length value stored in the apparatus in advance; and (4) a controlling unit for controlling not to perform the encryption processing or the decryption processing of the data in the data field when it is judged that the value of the length field is less than the minimum length value by comparing in the length comparing unit.

An encryption communication apparatus concerning this invention has a characteristic of including following elements:

(1) a communicating unit for sending and receiving communication data including at least a length field and a data field;

(2) an encryption processing unit for performing encryption processing or decryption processing of data in the data field in the communication data;

(3) a length comparing unit for comparing a value of the length field in the communication data received and a data length of the data field in the said communication data received; and (4) a controlling unit for controlling not to perform the encryption processing or the decryption processing of the data in the data field when it is judged that the value of the length field and the data length of the data field are not identical by comparing in the length comparing unit.

An encryption communication apparatus concerning this invention has a characteristic of including following elements:

(1) a communicating unit for sending and receiving communication data including at least a data field;

(2) an encryption processing unit for performing encryption processing or decryption processing of data in the data field in the communication data; and (3) a controlling unit for controlling not to perform the encryption processing or the decryption processing of remaining data when false data are detected in a case of performing the encryption processing or the decryption processing of the data in the data field in the communication data sequentially.

An encryption communication apparatus concerning this invention has a characteristic of including following elements:

(1) a communicating unit for sending and receiving communication data including at least a length field and a data field;

(2) an encryption processing unit for performing encryption processing or decryption processing of data in the data field in the communication data;

(3) a length comparing unit for comparing a value of the length field in the communication data received and a minimum length value stored in the apparatus in advance; and (4) a controlling unit for controlling to perform the encryption processing or the decryption processing of dummy data which are different from the data in the data field when it is judged that the value of the length field is less than the minimum length value by comparing in the length comparing unit.

An encryption communication apparatus concerning this invention has a characteristic of including following elements:

(1) a communicating unit for sending and receiving communication data including at least a length field and a data field;

(2) an encryption processing unit for performing encryption processing or decryption processing of data in the data field in the communication data;

(3) a length comparing unit for comparing a value of the length field in the communication data received and a data length of the data field in the said communication data received; and (4) a controlling unit for controlling to perform the encryption processing or the decryption processing of dummy data which are different from the data in the data field when it is judged that the value of the length field and the data length of the data field are not identical by comparing in the length comparing unit.

An encryption communication apparatus concerning this invention has a characteristic of including following elements:

(1) a communicating unit for sending and receiving communication data including at least a data field;

(2) an encryption processing unit for performing encryption processing or decryption processing of data in the data field in the communication data; and (3) a controlling unit for controlling to perform the encryption processing or the decryption processing of dummy data which are different from the data in the data field when false data are detected.

The encryption communication apparatus further includes a switching unit for switching input data input to the encryption processing unit, and the controlling unit has a characteristic of controlling to perform the encryption processing or the decryption processing of the dummy data by switching the switching unit to a side of the dummy data which are different from the normal data in the data field.

The encryption communication apparatus further includes a random number generating unit for generating a random number, and the controlling unit has a characteristic of using the random number generated by the random number generating unit as the dummy data.

An encryption communication apparatus concerning this invention has a characteristic of including following elements:

(1) a communicating unit for sending and receiving communication data including at least a length field and a data field;

(2) an encryption processing unit for performing encryption processing or decryption processing of data in the data field in the communication data;

(3) a nonvolatile memory for storing a normal key for the encryption processing unit;

(4) a length comparing unit for comparing a value of the length field in the communication data received and a minimum length value stored in the apparatus in advance; and (5) a controlling unit for controlling to perform the encryption processing or the decryption processing using a dummy key which is different from the normal key when it is judged that the value of the length field is less than the minimum length value by comparing in the length comparing unit.

An encryption communication apparatus concerning this invention has a characteristic of including following elements:

(1) a communicating unit for sending and receiving communication data including at least a length field and a data field;

(2) an encryption processing unit for performing encryption processing or decryption processing of data in the data field in the communication data;

(3) a nonvolatile memory for storing a normal key for the encryption processing unit;

(4) a length comparing unit for comparing a value of the length field in the communication data received and a data length of the data field in the said communication data received; and (5) a controlling unit for controlling to perform the encryption processing or the decryption processing using a dummy key which is different from the normal key when it is judged that the value of the length field and the data length of the data field are not identical by comparing in the length comparing unit.

An encryption communication apparatus concerning this invention has a characteristic of including following elements:

(1) a communicating unit for sending and receiving communication data including at least a data field;

(2) an encryption processing unit for performing encryption processing or decryption processing of data in the data field in the communication data;

(3) a nonvolatile memory for storing a normal key for the encryption processing unit; and (4) a controlling unit for controlling to perform the encryption processing or the decryption processing using a dummy key which is different from the normal key when false data are detected.

The encryption communication apparatus further includes a key switching unit for switching a key used in the encryption processing unit, and the controlling unit has a characteristic of controlling to perform the encryption processing or decryption processing by switching the key switching unit to the dummy key which is different from the normal key.

The encryption communication apparatus further includes a random number generating unit for generating a random number, and the controlling unit has a characteristic of using the random number generated by the random number generating unit as the dummy key.

The communication data include a command field, and the length comparing unit has a characteristic of specifying the minimum length value based on the value of the command field in the communication data.

The length comparing unit has a characteristic of specifying the minimum length value based on transaction order of the communication data.

BRIEF DESCRIPTION OF THE DRAWINGS

FIG. 6 shows an example of a correspondence table of command and minimum length value;

FIG. 7 shows an example of a correspondence table of communication transaction and a minimum length value;

BEST MODE FOR CARRYING OUT THE INVENTION

EMBODIMENT 1

Figure 1:
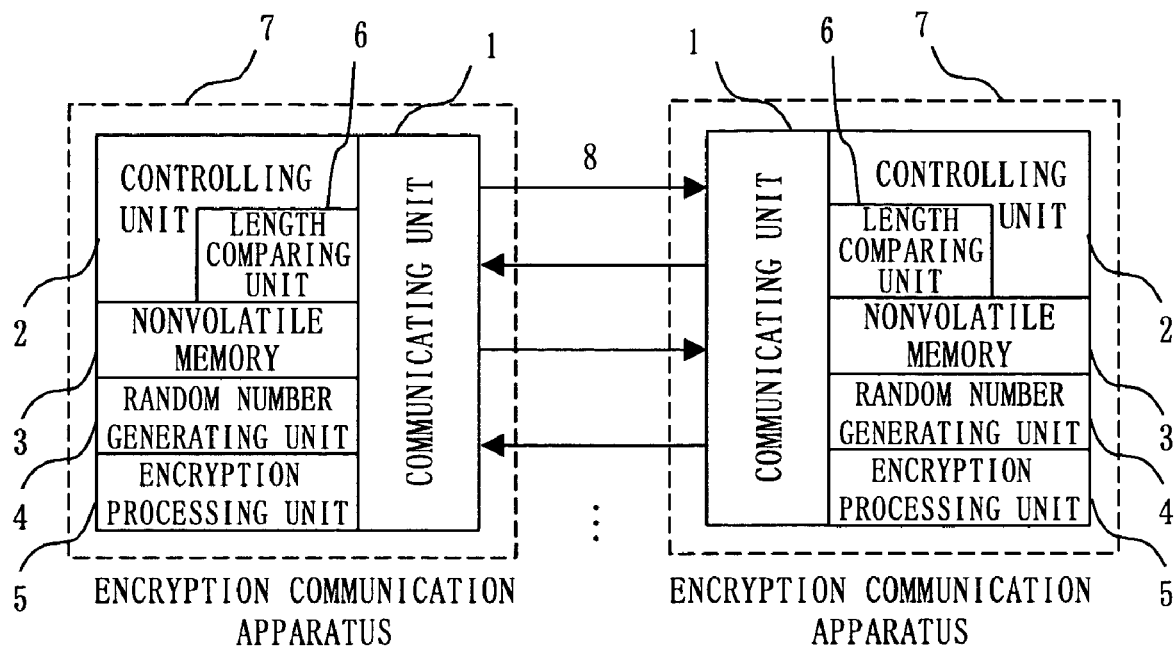
FIG. 1 shows a configuration of an encryption communication apparatus according to Embodiment 1.
Figure 2:
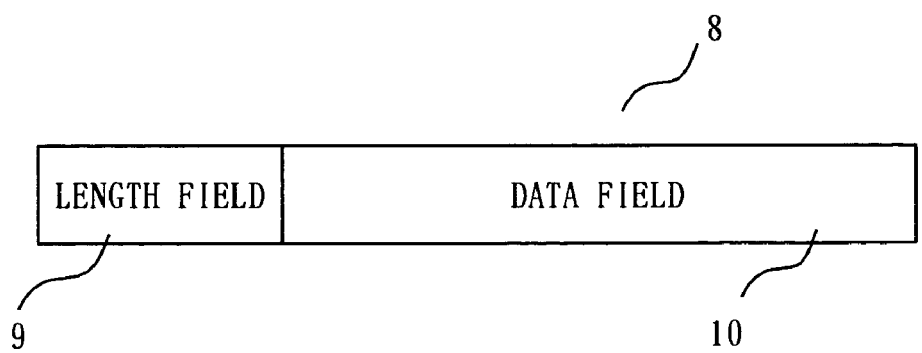
FIG. 2 shows a data structure of communication between encryption communication apparatuses.
Figure 3A:
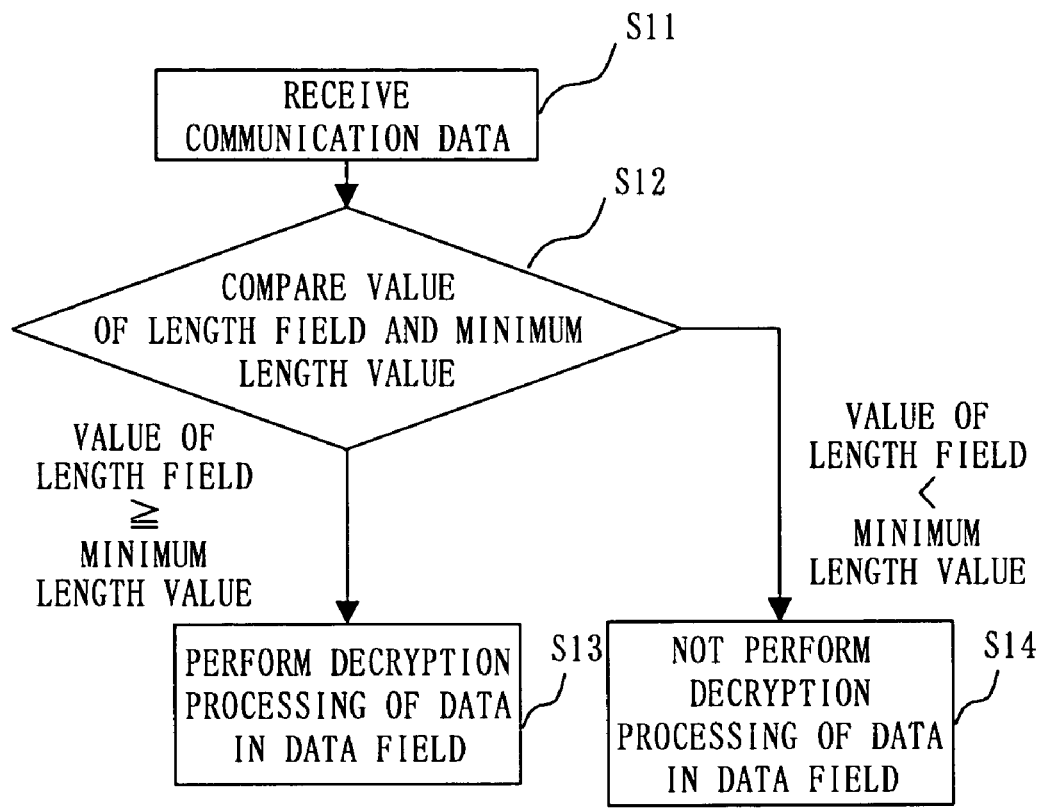
FIG. 3A shows an operation flow of the encryption communication apparatus.
Figure 3B:
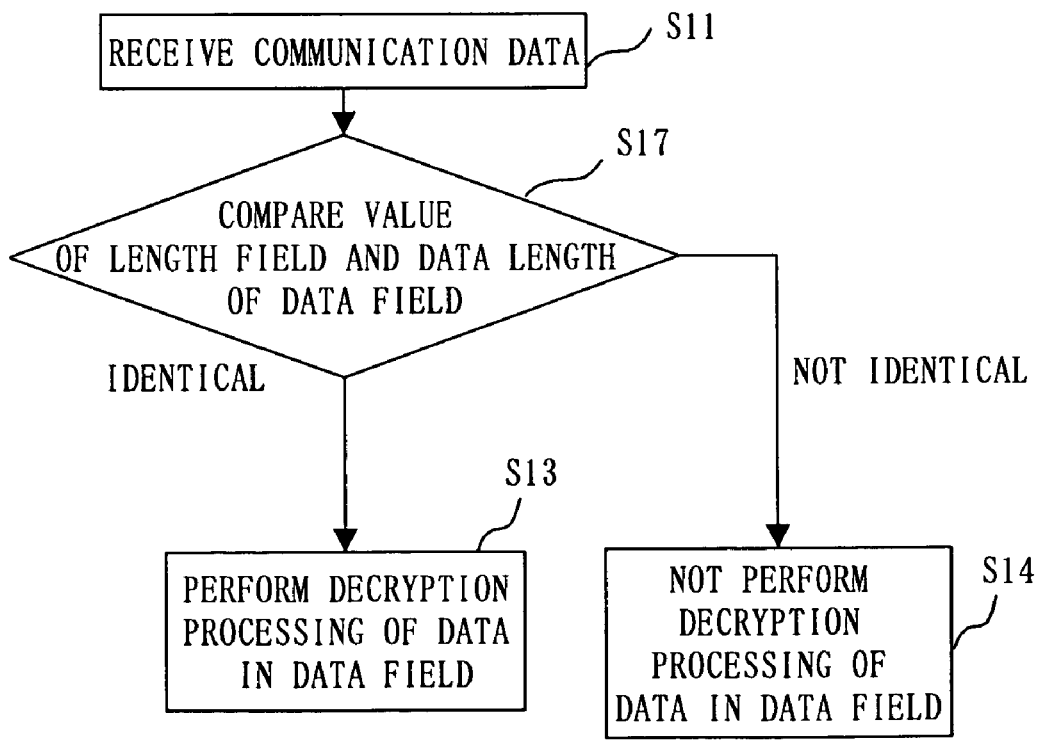
FIG. 3B shows an operation flow of the encryption communication apparatus.
Figure 4A:
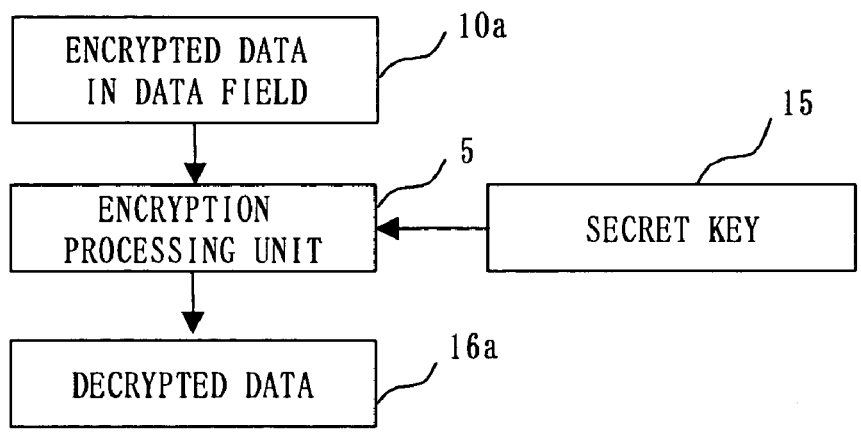
FIG. 4A shows a procedure of performing decryption (or signature verification) of encrypted data (or signature data) in the communication data.
Figure 4B:
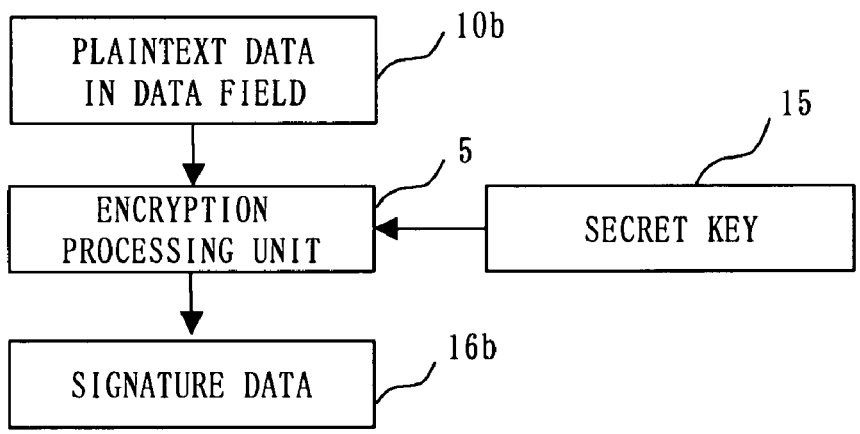
FIG. 4B shows a procedure of generating signature data from plaintext data in the communication data.

With reference to FIG. 1-FIG. 4B, Embodiment 1 is explained. FIG. 1 shows a configuration of an encryption communication apparatus according to Embodiment 1 of this invention. FIG. 2 shows a data structure of communication between encryption communication apparatuses. FIG. 3A and FIG. 3B show an operation flow of the encryption communication apparatus. FIG. 4A shows a procedure of performing decryption (or signature verification) of encrypted data (or signature data) in the communication data. FIG. 4B shows a procedure of generating a signature from plaintext data in the communication data.

In FIG. 1, a communicating unit 1 sends and receives communication data 8 including at least a length field and a data field. For example, a contact type interface or a contactless type interface for a smart card, a parallel interface based on Centronics Corporation or a serial interface, e.g., RS232C, etc., a cable interface, e.g., IEEE1394, USB (Universal Serial Bus), etc., a radio interface used for infrared communication, Bluetooth, radio LAN and DSRC (Dedicated Short Range Communication) or a cellular phone, a special interface, etc. are used as the communicating unit 1.

A controlling unit 2 cryptanalyzes the communication data 8 received by the communicating unit 1 (or generates the communication data 8 for sending), and also controls a whole apparatus. For example, the controlling unit 2 includes a CPU and a logic circuit, or if necessary, a ROM, a RAM, etc.

Confidential information, e.g. key, etc. used at a time of encryption processing is stored in a nonvolatile memory 3. A random number generating unit 4 generates a random number, and an encryption processing unit 5 performs encryption or decryption of the data (or signature generation or signature verification).

A length comparing unit 6 compares a value of the length field in the communication data 8 and a minimum length value stored in the apparatus in advance, or compares the value of the length field and the data length of the data field.

An encryption communication apparatus 7 shows an example of a configuration in which the encryption communication apparatus 7 (right side in figure) in a verifying side authenticates the encryption communication apparatus 7 (left side in the figure) in a certifying side by sending and receiving the communication data 8 in Embodiment 1.

The communication data 8 are illustrated. As illustrated in FIG. 2, the communication data 8 include at least a length field 9 and a data field 10. In the length field 9, a length value of the data field 10 in which authentication data, etc. are stored is stored. Further, the data field 10 includes one of encrypted data, plaintext data which are not encrypted, or mixture of the both data.

Before explanation of the operation, a policy on measures to improve the tamper-resistance, characterizing this invention, is explained. In the encryption communication apparatus according to the related art, when the operation is performed using the confidential information, there has been a problem that information, e.g., waveform of electric power, processing time, etc. which is useful for the attacker leaks to the outside, and consequently damage due to forgery increases. In explaining more in detail, for example, there has been a possibility that the attacker reveals the confidential information by intentionally inserting the false data from the communication line while monitoring an electric power source line in the encryption communication apparatus and analyzing the waveform of electric power, processing time, etc. when the operation is performed using the confidential information, and commits a crime, e.g., masquerading, tampering, eavesdropping in the communication line, etc. Therefore, for obtaining the encryption communication apparatus with excellent tamper-resistance while ensuring the sufficient security against various external threats, the following countermeasures should be taken.

(1) To detect intentional insertion of the false data, etc., and not to leak useful information to the attacker.

(2) To make the flow of information (communication procedure, data structure of authentication data, etc.) complicated.

Next, with reference to FIG. 1-FIG. 4B, operations are explained. At first, in the encryption communication apparatus 7 in the certifier side (left side in the figure), the controlling unit 2 which controls the whole apparatus sends the communication data 8 to the encryption communication apparatus 7 in the verifying side (right side in the figure) through following procedures.

(1) The random number R1 is generated by using the random number generating unit 4.

(2) Next, an application ID (indicating a type of application) existing in the encryption communication apparatus 7 in the certifier side is concatenated to the stated random number R1.

(3) The concatinated data are input to the encryption processing unit 5 and encrypted. At this time, the confidential information stored in the nonvolatile memory 3 is used as a key for encryption processing.

(4) Then, in the encryption communication apparatus 7 in the certifier side, the communication data 8 are sent to the encryption communication apparatus 7 in the verifying side through the communicating unit 1. In the length field 9 in the communication data 8, "24" indicating a data length of the data field 10 is stored. In the data field 10, "(Encrypted) application ID and random number R1, (unencrypted) application ID" of 24 bytes is stored.

Meanwhile, as illustrated in FIG. 3A, in the encryption communication apparatus 7 in the verifying side which is a receiving side of the data, the controlling unit 2 for controlling the whole apparatus processes the data through following procedures.

(1) The communication data 8 are received through the communicating unit 1 (step 11).

(2) The value of the length field 9 in the communication data 8 is compared with the minimum length value stored in e.g. the controlling unit 2 and the nonvolatile memory 3 in the length comparing unit 6 (step 12). The minimum length value is set in advance to be equal to a minimum data length of the data field 10 in the normal communication data 8.

(3) If the value of the length field 9 is more than or equal to the minimum length value, it is interpreted as the communication data 8 which are not false, and decryption processing of the data in the data field 10 is performed (step 13). Specifically, as illustrated in FIG. 4A, decrypted data 16a are generated from the encrypted data in the data field 10 using a secret key 15 stored in the nonvolatile memory 3, and regular processing for communication transaction is performed. Or, as illustrated in FIG. 4B, processing for signature generation is performed for plaintext data, and signature data 16b are generated. In this embodiment, the application ID decrypted through a data flow in FIG. 4A and the unencrypted application ID in the data field 10 are compared. When they are identical, the certifier side is authenticated.

(4) Meanwhile, in step 12 of FIG. 3A, if the value of the length field 9 is less than the minimum length value, they are interpreted as the false date, and decryption processing of the data in the data field 10 is not performed (step 14). This prevents the attacker from inserting the false data intentionally from the communication line and analyzing the waveform of electric power, processing time, etc. when the operation is performed using the confidential information. Particularly, this prevents the encryption processing unit 5 using the confidential information stored in the nonvolatile memory 3 from operating, and improves the difficulty against the analysis and the attack using short false data in short time.

Further, as illustrated in FIG. 3B, in the encryption communication apparatus 7 in the verifying side which is a receiving side of the data, the controlling unit 2 for controlling the whole apparatus processes the data through following procedures.

(1) The communication data 8 are received through the communicating unit 1 (step 11).

(2) The data field 10 in the communication data 8 is counted in a data length counting unit which is not illustrated, and an output value from the stated data length counting unit and the value of the length field 9 are compared in the length comparing unit 6 (step 17).

(3) If the value of the length field 9 and the output value from the stated data length counting unit are identical, they are interpreted as the communication data 8 which are not false, and decryption processing of the data in the data field 10 is performed (step 13). Specifically, as illustrated in FIG. 4A, the decrypted data 16a are generated from the encrypted data in the data field 10 using the secret key 15 stored in the nonvolatile memory 3, and regular processing for communication transaction is performed. Or, as illustrated in FIG. 4B, processing for signature generation of plaintext data is performed, and the signature data 16b are generated. For example, the decrypted application ID and the unencrypted application ID in the data field 10 are compared. When they are identical, the certifier side is authenticated.

(4) Meanwhile, if the value of the length field 9 and the output value from the stated data length counting unit are not identical, they are interpreted as the false date, and decryption processing of the data in the data field 10 is not performed (step 14). This also prevents the attacker from inserting the false data intentionally from the communication line and analyzing the waveform of electric power, processing time, etc. when the operation is performed using the confidential information.

As stated, in this embodiment, the length comparing unit 6 for comparing the value of the length field 9 in the received communication data 8 and the minimum length value that is stored in the apparatus in advance or the length comparing unit 6 for comparing the value of the length field 9 and the data length of the data field 10 is provided. When the stated length field value is less than the stated minimum length value, or the length field value and the data length of the data field are not identical, the decryption processing (or encryption processing and signature processing) of the data in the data field 10 is not performed. Because of this configuration, there is an effect of obtaining the encryption communication apparatus with excellent tamper-resistance, which can prevent leakage of the useful information to the attacker.

Further, in this embodiment, various alterations and combinations are possible unless deviating from the main purpose of this invention. For example, a configuration of combining FIG. 3A and FIG. 3B is possible. Specifically, it is also possible that the value of the length field 9 and the minimum length value are compared after the communication data 8 are received, and then the value of the length field 9 and the data length of the data field 10 are compared to determine if decryption (or encryption, signature generation or signature verification) should be performed for the encrypted (or decrypted) data or the plaintext data in the data field 10. Further, there is no special restriction on comparison order. Additionally, it is also possible that the length comparing unit 6 is not shared, and the length comparing unit 6 is provided respectively.

Further, in description of the above-stated embodiment, the minimum length value is stored in the controlling unit 2 and the nonvolatile memory 3. However, as long as it is stored in the apparatus, there is no special restriction. Further, by including a value of a comparison object in a range when various comparison is performed, it is needless to say that a similar effect is realized even when descriptions are changed from "less than ~" to "less than or equal to ~" or "more than or equal to ~" to "more than ~".

Further, as long as a field requires the encryption and the communication, e.g., mutual authentication, identity authentication, data authentication, etc., various alterations of the encryption communication apparatus 7 illustrated in this embodiment are possible without restricting use and configuration. For example, in the configuration of Embodiment 1, the encryption communication apparatus 7 in the left side is authenticated by the encryption communication apparatus 7 in the right side. However, it is also possible that the configuration is reversed. It is also possible to authenticate mutually or authenticate a plural times. Further, at the time of authentication, it is possible to adopt a method of using the common key, a method of using the public key (including signature generation and signature verification), etc., and there is no special restriction. Additionally, instead of encrypting the communication data 8 in the encryption communication apparatus 7 in one side and decrypting in the encryption communication apparatus 7 in the other side, it is possible to encrypt the communication data 8 after decrypting. Further, it is also possible to exchange the random number in a public key method and perform encryption communication using the random number as a session key. Further, it is also possible to obtain a hash value by using a one-way function after receiving the plaintext data in the encryption communication apparatus 7 in one side and perform processing of signature generation for the hash value in the encryption communication apparatus 7, and to verify the signature in the encryption communication apparatus 7 in the other side, and there is no special restriction. Additionally, in the above-stated embodiment, authentication is performed using the application ID. However, it is also possible that the authentication is performed using the random number, contract information, etc., and there is no special restriction. Further, even when steps 13 and 14 in FIG. 3A are interpreted as "perform/not perform decryption processing of a portion of the data field 10" or "perform/not perform decryption processing of all of the data field 10", or a "decryption processing" part is replaced by "encryption processing" or "signature generation" and "signature verification", etc., a similar effect is realized. Further, the above-stated operation flow shows an example of an authentication phase, and any addition or alterations are possible for convenience.

Further, in the configuration of FIG. 1, when it is supposed that the encryption communication apparatus 7 in the left side of the figure is a cellular phone and the encryption communication apparatus 7 in the right side of the figure is a smart card, a communicating unit to communicate with a base station for the cellular phone, a credit card authentication station which are not illustrated and a flow of communication can be added for convenience. Additionally, to simplify the explanation in FIG. 1, the configuration in which two encryption communication apparatuses 7 are arranged is described. However, the configuration can be either a single encryption communication apparatus or a combination of a plurality of encryption communication apparatuses. Further, it is also possible to combine the encryption communication apparatus 7 according to this invention with another encryption communication apparatus.

Figure 5:
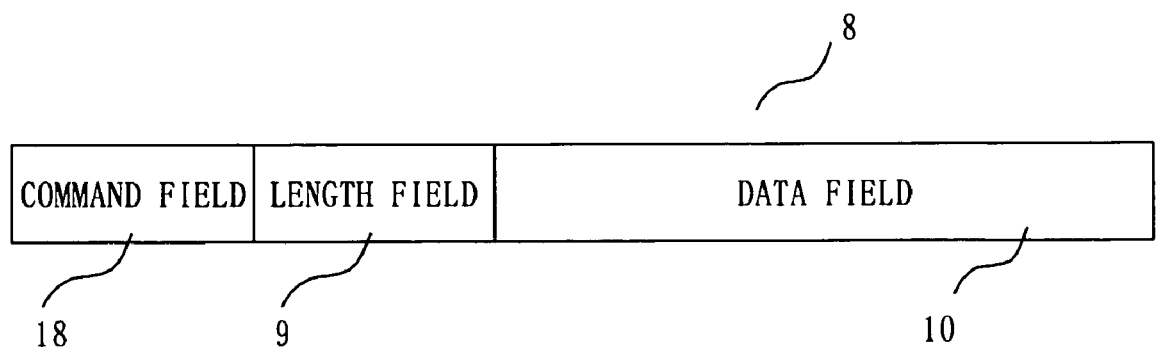
FIG. 5 shows a data structure of communication including a command field.

As illustrated in FIG. 5, it is also possible to add a command field 18 at a beginning of the length field 9 and the data field 10 in the communication data 8. By providing the command field 18, there is an effect that a fixed communication transaction which has been mutually determined becomes multipurpose. For example, by cryptanalyzing the command field 18 at the beginning in the controlling unit 2, etc., it is possible to know that a present phase is a phase of authentication data, request for reading out special data, etc., and the apparatus becomes more convenient.

Additionally, even though the minimum length value is fixed in the above-stated example, it is possible to provide an apparatus with more excellent tamper-resistance by storing a table, etc. as illustrated in FIG. 6 and FIG. 7 in the apparatus in advance and changing the minimum length value to correspond to a value (command) of the command field 18 or through a procedure of the communication transaction. A specific operation flow is as follows.

1. A Case of Making the Command Correspond to the Minimum Length Value (1) The communication data 8 are received through the communicating unit 1, and content (command) of the command field 18 is cryptanalyzed by the controlling unit 2, for example.

(2) The minimum length value corresponding to the stated command is obtained from FIG. 6, and the value of the length field 9 in the communication data 8 is compared with the stated minimum length value in the length comparing unit 6.

(3) Hereinafter, the procedure is same as the above-stated procedure.

2. A Case of Making Transaction Order of Communication Correspond to the Minimum Length Value (1) The communication data 8 are received through the communicating unit 1, and the transaction order of communication is confirmed in a counting unit which is not illustrated.

(2) A minimum length value corresponding to the stated transaction order of communication is obtained from FIG. 7. Then, the value of the length field 9 in the communication data 8 is compared with the stated minimum length value in the length comparing unit 6.

(3) Hereinafter, the procedure is same as the above-stated procedure.

Moreover, this operation is also effective in other embodiments using the minimum length value. In the above-stated Embodiment 1, the length comparing unit 6 and the controlling unit 2 are independent. However, it is also possible that the length comparing unit 6 and the controlling unit 2 are combined.

EMBODIMENT 2

Figure 8A:
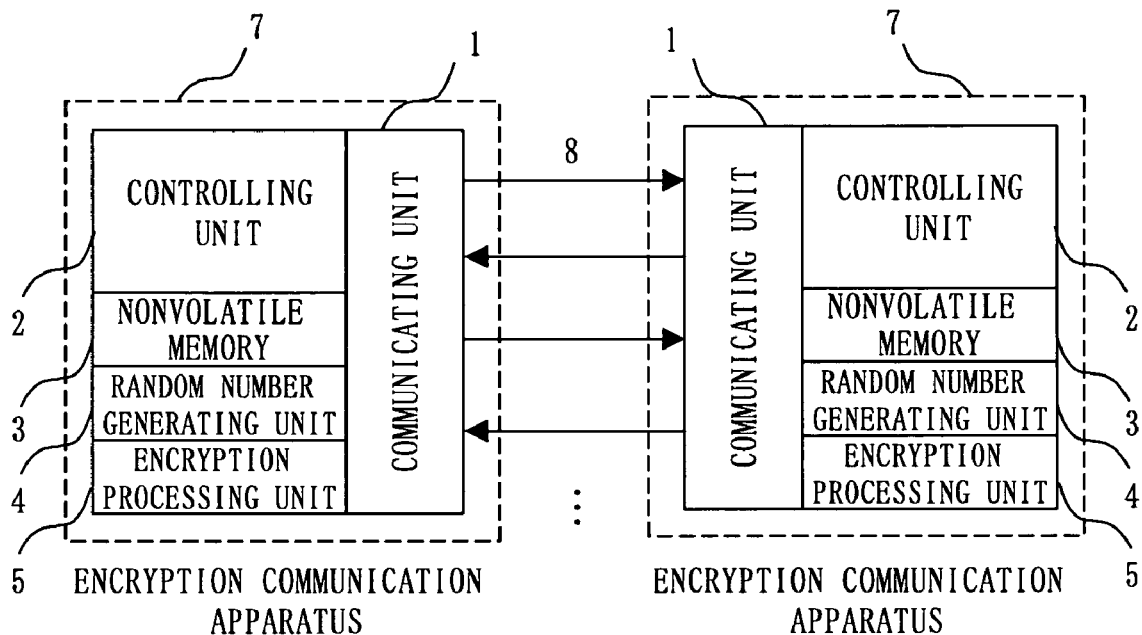
FIG. 8A shows a configuration in Embodiment 2.
Figure 8B:
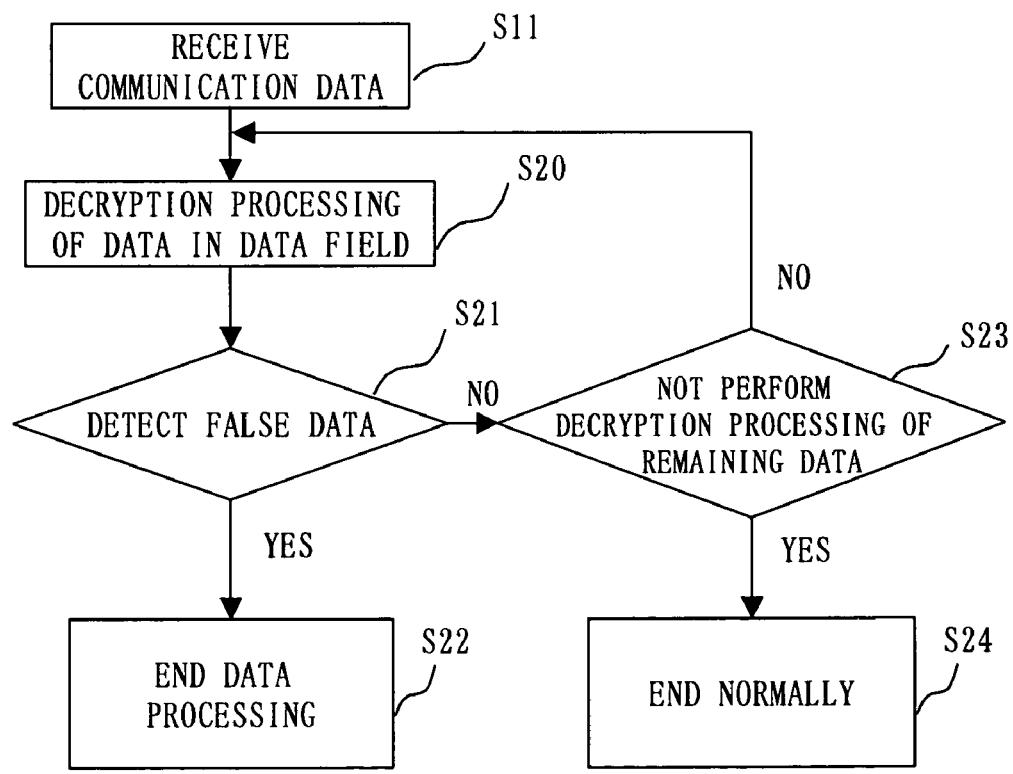
FIG. 8B shows a flow in Embodiment 2.
Figure 9:
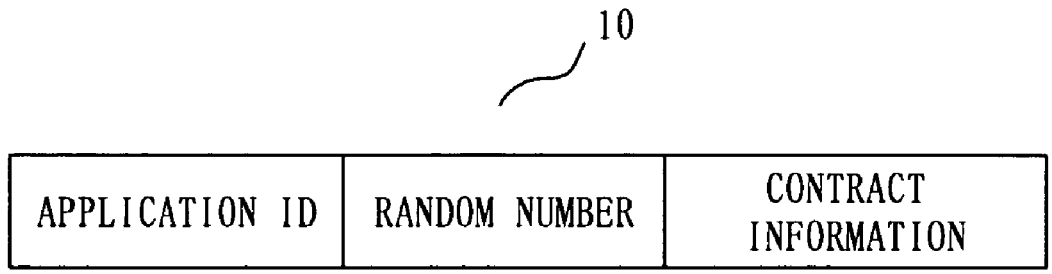
FIG. 9 shows a data structure of communication in Embodiment 2.

With reference to FIG. 8A-FIG. 9, Embodiment 2 is explained. FIG. 8A shows an example of a parking system using the encryption communication apparatus 7 according to this invention. The encryption communication apparatus 7 in the right side of the figure corresponds to a roadside machine, and the encryption communication apparatus 7 in the left side of the figure corresponds to an on-board equipment in vehicle. Same signs in FIG. 8A indicate same or corresponding elements in FIG. 1. FIG. 8B shows an operation flow in this invention. FIG. 9 shows an example of the data field 10 in the encrypted communication data 8.

The parking system is a system which can allow passage of a vehicle without stopping at a toll gate by communicating information, e.g., information on a type of the vehicle, time when the vehicle has passed, etc. which is necessary for toll calculation and user information, e.g., credit card number, etc. which is necessary for settlement by radio between the on-board equipment in vehicle, equipped on the vehicle and the roadside machine installed in the toll gate. Since the roadside machine and the on-board equipment in vehicle which are encryption communication apparatuses 7 authenticate each other and send and receive various data including settlement information, it is essential to ensure the security. Therefore, in Embodiment 2 of this invention, countermeasures in the above-stated policy on measures "to detect intentional insertion of the false data, and not to leak useful information to the attacker" are taken.

Next, with reference to FIG. 8A-FIG. 9, the operation is explained. The operation is almost same as above-stated Embodiment 1. At first, in the encryption communication apparatus 7 (left side in the figure) in a side of the on-board equipment in vehicle, the controlling unit 2 for controlling the whole apparatus sends the communication data 8 to the encryption communication apparatus 7 (right side in the figure) in the roadside machine through following procedures.

(1) The random number R1 is generated by using the random number generating unit 4.

(2) Next, an application ID, the stated random number R1 and contract information existing in the encryption communication apparatus 7 in the side of the on-board equipment in vehicle are concatenated as shown in FIG. 9.

(3) The concatenated data are input to the encryption processing unit 5 and encrypted. At this time, the confidential information stored in the nonvolatile memory 3 is used as a key for encryption processing.

(4) Then, in the encryption communication apparatus 7 in the side of the on-board equipment in vehicle, the communication data 8 are sent to the encryption communication apparatus 7 in the side of the roadside machine through the communicating unit 1.

Meanwhile, as illustrated in FIG. 8B, in the encryption communication apparatus 7 in the roadside machine, i.e., data receiving side, the controlling unit 2 for controlling the whole apparatus processes the data through following procedures.

(1) The communication data 8 are received through the communicating unit 1 (step 11).

(2) A block at a beginning of the data field 10 in the communication data 8 is input to the encryption processing unit 5, and decrypted (step 20). At this time, the confidential information stored in the nonvolatile memory 3 is used as a key for encryption processing.

(3) If the decrypted data are not regulated application ID, they are interpreted as the false data (step 21), and decryption processing of remaining data in the data field 10 is not performed (step 22). This is for preventing the attacker from intentionally inserting the false data from the communication line and analyzing the waveform of electric power, processing time, etc. when the operation is performed using the confidential information. Particularly, since the encryption processing unit 5 using the confidential information stored in the nonvolatile memory 3 is not operated, the difficulty against the analysis and the attack using short false data in short time is improved.

(4) Meanwhile, if the decrypted data are the regulated data and the data processing isn't completed (step 23), a next block in the data field 10 is decrypted in the encryption processing unit 5 (step 20), and it is checked if they are the false data (step 21). Then, when the data processing is not completed, step 20 is repeated. When the data processing is completed, the decryption processing is completed normally (step 24). The above-stated "the data processing is completed" means that the decryption processing corresponding to a length of the length field 9 is completed.

In this embodiment, when the data are cryptanalyzed while the decryption processing (or encryption processing and signature processing) of the encrypted (or decrypted) data in the data field 10 is performed sequentially, in a case that the false data are detected, the decryption processing (or encryption processing and signature processing) is not performed for the remaining data. Therefore, there is an effect of obtaining the encryption communication apparatus with excellent tamper-resistance which does not leak the useful information to the attacker.

Further, it is possible to make various alterations also in this embodiment. For example, application of content and various alternation stated in Embodiment 1 is possible. Further, it is possible to combine Embodiment 1 and Embodiment 2. For example, the following operation flow is possible.

(1) After the communication data 8 are received, the value of the length field 9 and the minimum length value are compared. When the value of the length field 9 is less, the decryption processing of the data in the data field 10 is not performed.

(2) Meanwhile, when the value of the length field 9 is more than or equal to the minimum length value, the decryption processing of the data in the data field 10 is performed, and it is checked if the data are the false data. (3) When the decrypted data are the false data, the decryption processing of the remaining data is not performed. When the data are the normal data, the decryption processing in the data field 10 and checking of the false data are performed repeatedly.

Further, in the above-stated example, the false data are distinguished by cryptanalyzing the application ID. However, there is no special restriction as long as the data can be verified. For example, it is possible to store the value of the length field 9 in the encrypted data and check. An authentication code using the one-way function and signature data or a value of a mutual random number, a record number to be read out, etc. are not regulated specifically. Here, various alterations are possible unless deviating from the main purpose of this invention, i.e, the decryption processing of the data in the data field 10 is performed sequentially, and when the false data are detected, the decryption processing of the remaining data is not performed. For example, there is no restriction on a data format in FIG. 9 and a block size, etc. to decrypt.

EMBODIMENT 3

Embodiment 3 is explained. In this embodiment, Embodiment 1 and Embodiment 2 are improved. When the value of the length field 9 is less than the minimum length value, or the value of the length field 9 and the data length of the data field 10 are not identical, or the false data are detected in the data field 10, decryption processing (or encryption processing or signature processing) is performed using dummy data which are different from the received data.

Figure 10:
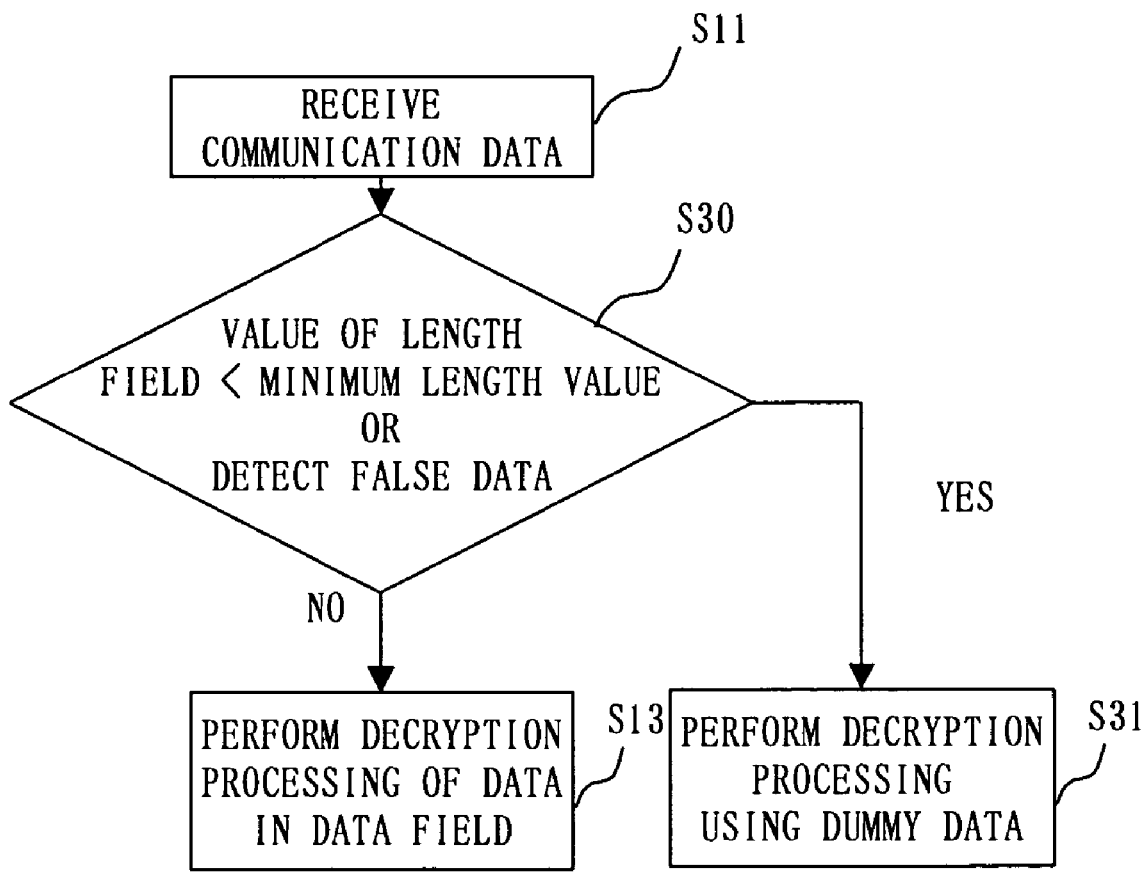
FIG. 10 shows a processing flow in Embodiment 3.
Figure 11A:
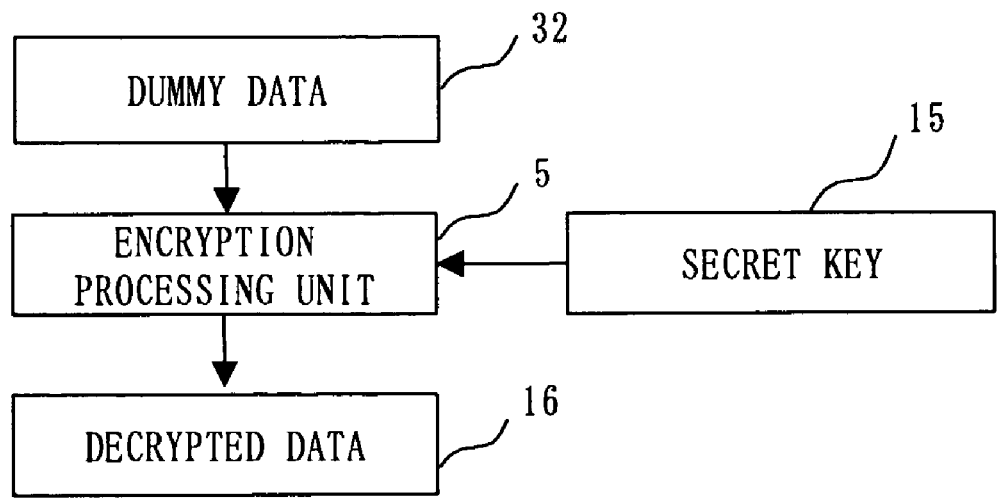
FIG. 11A shows a data flow in Embodiment 3.
Figure 11B:
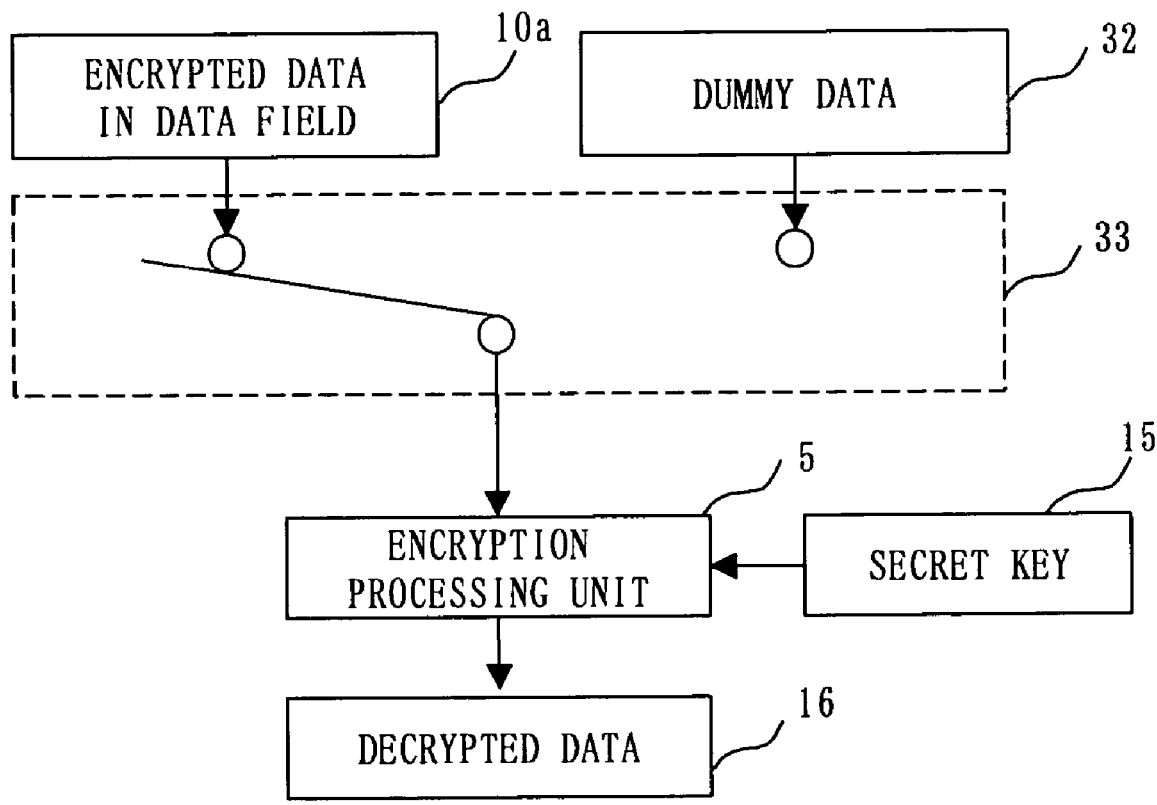
FIG. 11B shows a data flow in Embodiment 3.

FIG. 10, FIG. 11A, and FIG. 11B are figures for explaining the data flow in Embodiment 3. In FIG. 10 and FIG. 11A, step 30 is a step for comparing with the minimum length value and detecting the false data, step 31 is a step for performing the decryption processing using the dummy data, and dummy data 32 are used as input data to the encryption processing unit 5. In FIG. 10, same signs indicate same or corresponding elements in FIG. 3A, FIG. 3B, or FIG. 8B. In FIG. 11A, same signs indicate same or corresponding elements in FIG. 4A.

With reference to FIG. 1, FIG. 8A, FIG. 10 and FIG. 11A, operations are explained. Since the explanation on FIG. 1 and FIG. 8A is almost same as Embodiment 1 and Embodiment 2, the explanation is focused on FIG. 10 and FIG. 11A. A schematic operation flow in this embodiment is as follows.

(1) After the communication data 8 are received (step 11), the value of the length field 9 and the minimum length value are compared (step 30). When the value of the length field 9 is less, the decryption processing is performed using the dummy data instead of the data in the data field 10 (step 31). Or, after detecting the false data (step 30), the decryption processing is performed using the dummy data (step 31).

(2) Meanwhile, when the value of the length field 9 is more than or equal to the minimum length value, the decryption processing is performed using the data in the data field 10 (step 13). Or, when there are no false data, the decryption processing is performed using the data in the data field 10 (step 13). As illustrated in FIG. 11A, in the decryption processing, the dummy data 32 which are different from the normal data are input to the encryption processing unit 5 by an instruction from the controlling unit 2, and decrypted data 16 are obtained.

The dummy data are explained in detail. The dummy data are used for making the attacker believe that the decryption processing (or encryption processing or signature processing) is performed using the normal data. For example, data shifted by one byte, or inverse data of the normal received data are used. Or, content in the memory in the controlling unit 2 is used as the dummy data. Further, it is also possible to store the dummy data in the nonvolatile memory 3 in advance and use the stated data, or to switch between a plurality of dummy data, or to use an output value from a counter unit which is not illustrated as the dummy data. Further, it is also possible that an exclusive-OR operation of the dummy data which are generated by shifting the normal received data by one byte and stored in the nonvolatile memory 3 in advance is performed to generate final dummy data. It is also possible to generate the dummy data by performing various operations and processing. Additionally, it is also possible that the decrypted data 16 themselves are used as the dummy data.

As stated, when the length field value is less than the minimum length value or the false data are detected in the data field, the decryption processing (or encryption processing or signature processing) is performed using the dummy data which are different from the received data. Therefore, there is an effect that the apparatus with excellent tamper-resistance can be obtained.

In this embodiment, application of the content stated in Embodiment 1 and 2 and various alterations are possible. For example, in above-stated Embodiment 3, the combination of Embodiment 1 and Embodiment 2 has been explained. However, each of them can be configured independently. Specifically, it is possible to use step 31 in FIG. 10 instead of step 14 in FIG. 3A and FIG. 3B in Embodiment 1. Further, it is also possible to use step 31 in FIG. 10 instead of step 22 in FIG. 8B in Embodiment 2. In step 30 in FIG. 10, it is possible to compare the value of the length field 9 and the minimum length value, detect the false data, and compare the value of the length field 9 and the data length of the data field 10.

Further, as illustrated in FIG. 11B, it is possible to provide a switching unit 33 for switching between the encrypted data (or decrypted data or plaintext data) in the data field 10 and the dummy data. With reference to FIG. 10, the operation flow in this case is explained.

(1) After the communication data 8 are received, the value of the length field 9 and the minimum length value are compared (step 30). When the value of the length field 9 is less, the decryption processing is performed using the dummy data instead of the normal data in the data field 10 (step 31). Or, after detecting the false data, the decryption processing is performed using the dummy data (step 31).

(2) Meanwhile, when the value of the length field 9 is more than or equal to the minimum length value, the decryption processing of the data in the data field 10 is performed. Or, when there are no false data, the decryption processing is performed using the data in the data field 10 (step 13). As illustrated in FIG. 11B, in the decryption processing, it is possible to switch between the encrypted data (or decrypted data or plaintext data) in the data field 10 and the dummy data by controlling the switching unit 33 by the controlling unit 2. The switching unit 33 can be configured either in H/W or S/W, and there is no restriction.

EMBODIMENT 4

Figure 12:
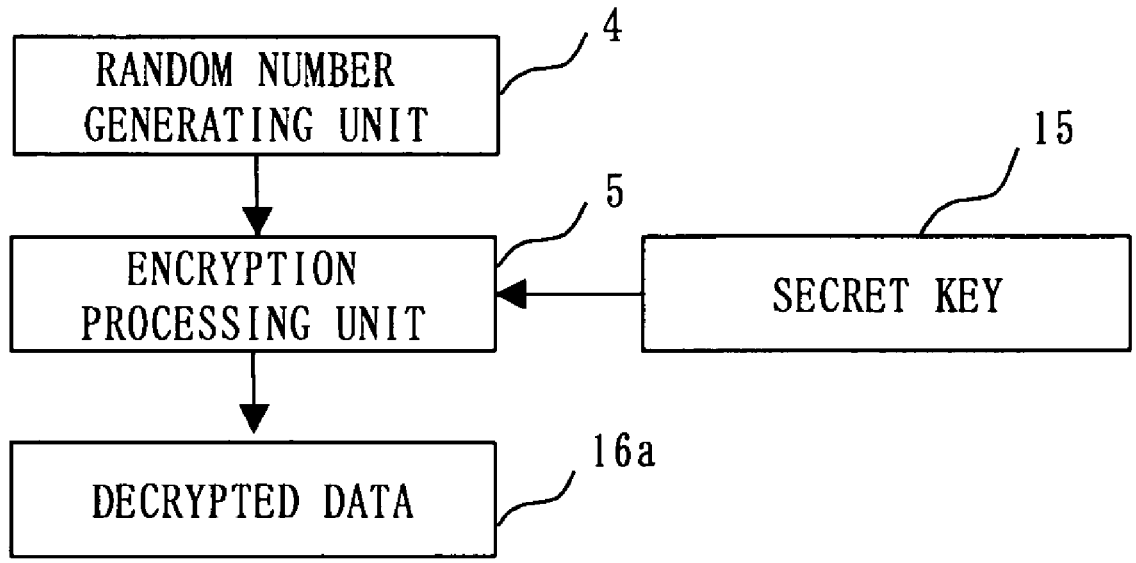
FIG. 12 shows a data flow in Embodiment 4.

Embodiment 4 is explained. In this embodiment, Embodiment 3 is improved, and a random message which is an output from the random number generating unit 4 is used instead of the dummy data. In FIG. 12, same signs indicate same or corresponding elements in FIG. 11A. In Embodiment 4 of this invention, the countermeasures "to detect intentional insertion of the false data, and not to leak useful information to the attacker" in the above-stated policy on measures is taken.

Next, with reference to FIG. 1, FIG. 10 and FIG. 12, the operation is explained. Since the operation is almost same as Embodiment 3, the explanation is focused on FIG. 12. A schematic operation flow in this embodiment is as follows.

(1) After the communication data 8 are received, when the value of the length field 9 is less or the value of the length field 9 and the data length of the data field 10 are not identical or the false data are detected, the decryption processing is performed using the random message instead of the normal data in the data field 10. Specifically, as illustrated in FIG. 12, an output from the random number generating unit 4 is input to the encryption processing unit 5, and the decrypted data 16 are generated using the secret key 15 stored in the nonvolatile memory 3.

(2) Meanwhile, when the value of the length field 9 is more than or equal to the minimum length value, or the value of the length field 9 and the data length of the data field 10 are identical, or there are no false data, the decryption processing of the normal data in the data field 10 is performed.

As stated, when the value of the length field 9 is less than the minimum length value, or the value of the length field 9 and the data length of the data field 10 are not identical, or the false data are detected in the data field 10, the decryption processing (or encryption processing or signature processing) is performed using the random message which is an output from the random number generating unit 4. Therefore, there is an effect that the apparatus with excellent tamper-resistance can be obtained.

In this embodiment, application of the content stated in Embodiment 1-3 and various alterations and combinations are possible. For example, as input data to the encryption processing unit 5, besides the output from the random number generating unit 4, it is possible to use both the output from the random number generating unit 4 and the dummy data stated in Embodiment 3 by switching. Or, it is also possible to input after performing operation or processing. Further, it is desirable that the random number generating unit 4 is a genuine random number by a H/W configuration. However, it is also possible that it is a pseudo-random number or a S/W processing, and there is no special restriction.

EMBODIMENT 5

Figure 13:
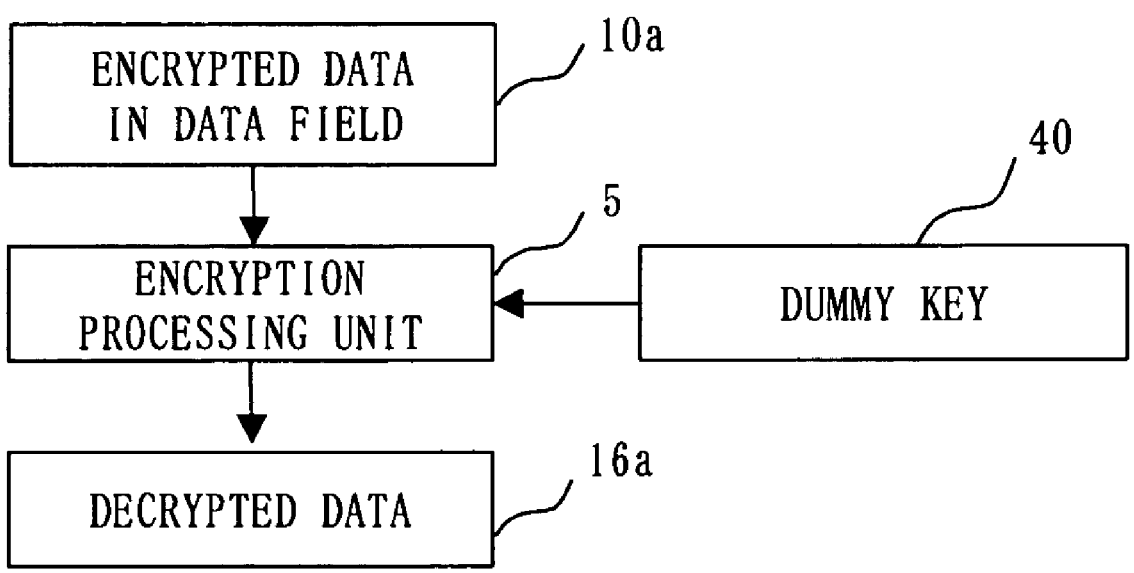
FIG. 13 shows a data flow in Embodiment 5.

Embodiment 5 is explained. In Embodiment 5, Embodiment 1-4 are improved. In decryption processing (or encryption processing or signature processing), a dummy key is used instead of a key used for the encryption processing 5. The dummy key is used for making the attacker believe that the decryption processing is performed using a normal key. In FIG. 13, same signs indicate same or corresponding elements in FIG. 4A. In Embodiment 5 of this invention, the countermeasures "to detect intentional insertion of the false data, and not to leak useful information to the attacker" in the above-stated policy on measures is taken.

Next, with reference to FIG. 1 and FIG. 13, the operation is explained. Since the operation is almost same as Embodiment 1-4, the explanation is focused on FIG. 13. A schematic operation flow in this embodiment is as follows.

(1) After the communication data 8 are received, when the value of the length field 9 is less than the minimum length value, or the value of the length field 9 and the data length of the data field 10 are not identical, or the false data are detected, the decryption processing is performed using the normal data in the data field 10 and a dummy key 40. Specifically, as illustrated in FIG. 13, the decrypted data 16 are generated using the dummy key 40 which is different from the secret key stored in the nonvolatile memory 3.

(2) Meanwhile, when the value of the length field 9 is more than or equal to the minimum length value, or the value of the length field 9 and the data length of the data field 10 are identical, or there are no false data, the decryption processing of the normal data in the data field 10 is performed.

The dummy key 40 is explained in detail. As the dummy key 40, it is possible to use a value generated by adding a determined value to a value of a normal key or shifting. Or, the content of the memory in the controlling unit 2 or a value of a program counter can be used as the dummy key 40. It is also possible to store the dummy key 40 in the nonvolatile memory 3 in advance and use the dummy key 40. It is also possible to switch between a plurality of dummy keys 40. Or, it is also possible to generate the dummy key 40 by performing various operation and processing. In any case, it is sufficient if the dummy key 40 is the key which is different from the normal key.

As stated, when the value of the length field 9 is less than the minimum length value, or the value of the length field 9 and the data length of the data field 10 are not identical, or the false data are detected in the data field 10, the decryption processing (or encryption processing) is performed using the dummy key 40 which is different from the key for the encryption processing unit 5 stored in the nonvolatile memory 3. Therefore, there is an effect that the encryption communication apparatus with excellent tamper-resistance can be obtained.

In this embodiment, application of the content stated in Embodiment 1-4 and various alterations and combinations are possible.

EMBODIMENT 6

Figure 14A:
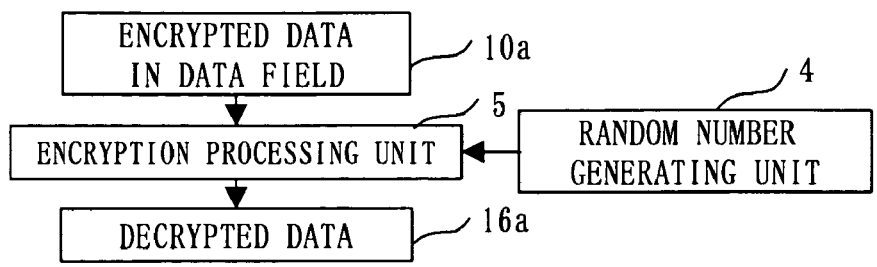
FIG. 14A shows a configuration and a flow in Embodiment 6.

Embodiment 6 is explained. In this embodiment, Embodiment 5 is improved. When the length field value is less than the minimum length value, or the value of the length field 9 and the data length of the data field 10 are not identical, or the false data are detected in the data field 10, decryption processing (or encryption processing or signature processing) is performed using the dummy key which is an output from the random number generating unit 4. In FIG. 14A and FIG. 14D, same signs indicate same or corresponding elements in FIG. 4A, FIG. 11A and FIG. 11B. In FIGS. 14C and 14D, a key switching unit 34 switches between the secret key 15 and the output from the random number generating unit 4. In Embodiment 6 of this invention, the above-stated countermeasures "to detect intentional insertion of the false data, and not to leak useful information to the attacker" in the policy on the measures is taken.

Next, with reference to FIG. 1, FIG. 14A-FIG. 14D, operations are explained. Since the explanation is almost same as Embodiment 1-5, the explanation is focused on FIG. 14A-FIG. 14D.

At first, a schematic operation flow in this embodiment is explained sequentially from FIG. 14A.

(1) After the communication data 8 are received, when the value of the length field 9 is less, or the value of the length field 9 and the data length of the data field 10 are not identical, or the false data are detected, the decryption processing is performed using the normal data in the data field 10 and the output from the random number generating unit 4.

(2) Meanwhile, when the value of the length field 9 is more than or equal to the minimum length value, or the value of the length field 9 and the data length of the data field 10 are identical, or there are no false data, the decryption processing of the normal data in the data field 10 is performed.

Figure 14B:
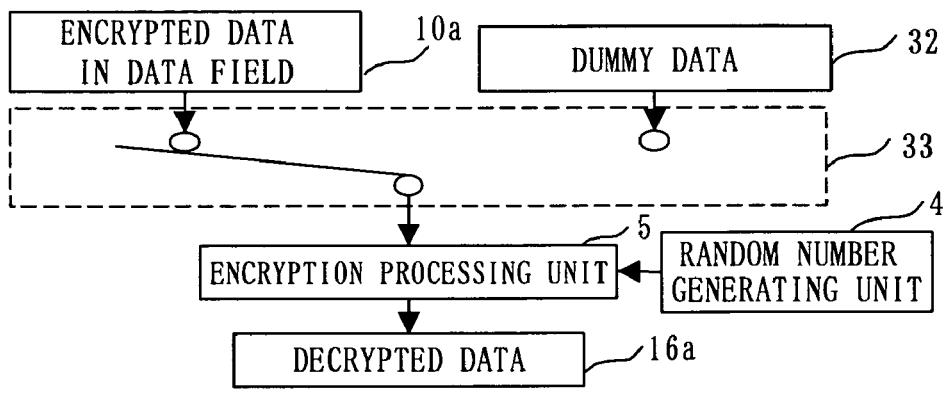
FIG. 14B shows a configuration and a flow in Embodiment 6.
Figure 14C:
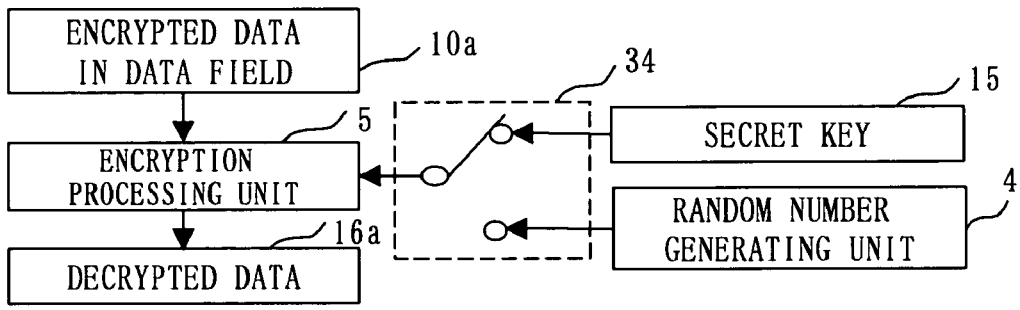
FIG. 14C shows a configuration and a flow in Embodiment 6.
Figure 14D:
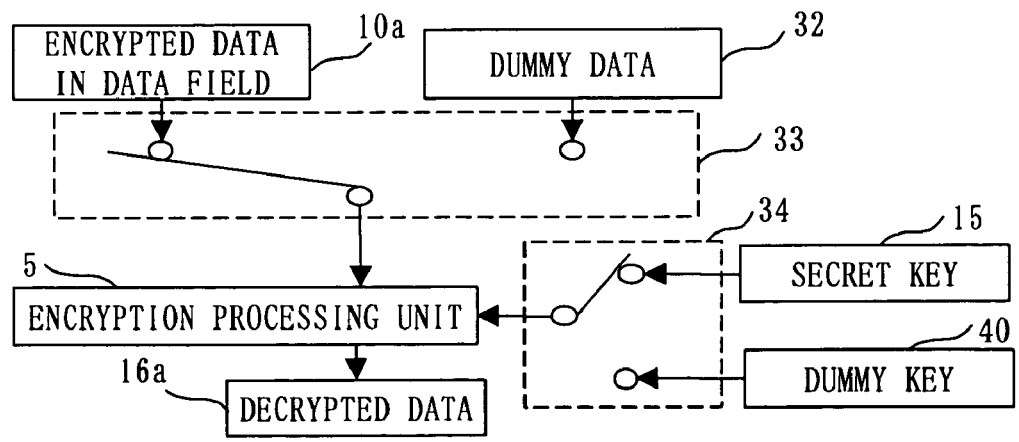
FIG. 14D shows a configuration and a flow in Embodiment 6.

Next, with reference to FIG. 14B, a modified example of Embodiment 6 is explained. A schematic operation flow is as follows.

(1) After the communication data 8 are received, when the value of the length field 9 is less than the minimum length value, or the value of the length field 9 and the data length of the data field 10 are not identical, or the false data are detected, the decryption processing is performed using the output from the random number generating unit 4 by switching to a side of the dummy data 32 which are different from the normal data in the data field 10 by using the switching unit 33.

(2) Meanwhile, when the value of the length field 9 is more than or equal to the minimum length value, or the value of the length field 9 and the data length of the data field 10 are identical, or there are no false data, the decryption processing is performed using the normal data in the data field 10. (In this case, the switching unit 33 is switched to a left side by the controlling unit 2.)

Next, with reference to FIG. 14C, a modified example of Embodiment 6 is explained. A schematic operation flow is as follows.

(1) After the communication data 8 are received, when the value of the length field 9 is less than the minimum length value, or the value of the length field 9 and the data length of the data field 10 are not identical, or the false data are detected, the decryption processing of the normal data in the data field 10 is performed by switching to a side of the random number generating unit 4 which is different from the secret key 15 by using the key switching unit 34.

(2) Meanwhile, when the value of the length field 9 is more than or equal to the minimum length value, or the value of the length field 9 and the data length of the data field 10 are identical, or there are no false data, the decryption processing of the normal data in the data field 10 is performed using the secret key (normal key).

Next, with reference to FIG. 14D, a modified example of Embodiment 6 is explained. A schematic operation flow is as follows.

(1) After the communication data 8 are received, when the value of the length field 9 is less than the minimum length value, or the value of the length field 9 and the data length of the data field 10 are not identical, or the false data are detected, the decryption processing is performed using the dummy data 32 which are different from the normal data by using the switching unit 33 and switching to the dummy key 40 including an output from the random number generating unit 4 by using the key switching unit 34.

(2) Meanwhile, when the value of the length field 9 is more than or equal to the minimum length value, or the value of the length field 9 and the data length of the data field 10 are identical, or there are no false data, the decryption processing of the normal data in the data field 10 is performed using the secret key (normal key). (At this time, the switching unit 33 is switched to the left side by the controlling unit 2, and the key switching unit 34 is switched to an up side.)

As stated, when the length field value is less than the minimum length value, or the value of the length field 9 and the data length of the data field 10 are not identical, or the false data are detected in the data field, the decryption processing (or encryption processing or signature processing) is performed using the dummy key 40 which is an output from the random number generating unit 4. Therefore, there is an effect that the encryption communication apparatus with excellent tamper-resistance can be obtained.

In this embodiment, application of the content stated in Embodiment 1-5 and various alterations and combinations are also possible. For example, "the encrypted data in the data field" 10a in FIG. 14A-FIG. 14D can be interpreted as "decrypted data or plaintext data." Further, the "decrypted data" 16a can be also described as "encrypted data and signature generation data or signature verification data." Additionally, the secret key 15 can be the public key. It is needless to say that the dummy data 32 can also be an output from a random number generating unit 32.

The encryption communication apparatus is a computer, and processing of each element can be executed by a program. Further, it is possible that the program is stored in a storing medium and read out from the storing medium by the computer.

INDUSTRIAL APPLICABILITY

There is an effect of preventing the attacker from inserting the false data intentionally from a communication line and analyzing the waveform of electric power, the processing time, etc. when operation is performed using the confidential information. Accordingly, the encryption communication apparatus with excellent tamper-resistance can be obtained.

Further, since the dummy data and the dummy key are used, it is possible to make the analysis difficult.

The invention claimed is:

1. An encryption communication apparatus comprising:
   (1) a communicating unit for sending and receiving communication data including at least a length field and a data field;
   (2) an encryption processing unit for performing encryption processing or decryption processing of data in the data field in the communication data;
   (3) a length comparing unit for comparing a value of the length field in the communication data received and a minimum length value stored in the apparatus in advance; and
   (4) a controlling unit for controlling to perform the encryption processing or the decryption processing of dummy data which are obtained by shifting the data in the data field or inverse data of the data in the data field when it is judged that the value of the length field is less than the minimum length value or less than or equal to the minimum length value by comparing in the length comparing unit in order to send a false message to an unauthorized user that the encryption processing or the decryption processing is performed using data in the data field.

2. An encryption communication apparatus comprising:
   (1) a communicating unit for sending and receiving communication data including at least a length field and a data field;
   (2) an encryption processing unit for performing encryption processing or decryption processing of data in the data field in the communication data;
   (3) a length comparing unit for comparing a value of the length field in the communication data received and a data length of the data field in the said communication data received; and
   (4) a controlling unit for controlling to perform the encryption processing or the decryption processing of dummy data which are obtained by shifting the data in the data field or inverse data of the data in the data field when it is judged that the value of the length field and the data length of the data field are not identical by comparing in the length comparing unit in order to send a false message to an unauthorized user that the encryption processing or the decryption processing is performed using data in the data field.

3. An encryption communication apparatus comprising:
   (1) a communicating unit for sending and receiving communication data including at least a data field;
   (2) an encryption processing unit for performing encryption processing or decryption processing of data in the data field in the communication data; and
   (3) a controlling unit for controlling to perform the encryption processing or the decryption processing of dummy data which are obtained by shifting the data in the data field or inverse data of the data in the data field when false data are detected in order to send a false message to an unauthorized user that the encryption processing or the decryption processing is performed using data in the data field.

4. The encryption communication apparatus according to claim 1-3, further comprising a switching unit for switching input data input to the encryption processing unit, wherein the controlling unit controls to perform the encryption processing or the decryption processing of the dummy data by switching the switching unit to a side of the dummy data which are different from the normal data in the data field.

5. The encryption communication apparatus according to claim 1-3, further comprising a random number generating unit for generating a random number, wherein the controlling unit uses the random number generated by the random number generating unit as the dummy data.

6. An encryption communication apparatus comprising:
   (1) a communicating unit for sending and receiving communication data including at least a length field and a data field;
   (2) an encryption processing unit for performing encryption processing or decryption processing of data in the data field in the communication data;
   (3) a nonvolatile memory for storing a normal key for the encryption processing unit;
   (4) a length comparing unit for comparing a value of the length field in the communication data received and a minimum length value stored in the apparatus in advance; and
   (5) a controlling unit for controlling to perform the encryption processing or the decryption processing using a dummy key which is obtained by shifting the normal key when it is judged that the value of the length field is less than the minimum length value or less than or equal to the minimum length value by comparing in the length comparing unit in order to send a false message to an unauthorized user that the encryption processing or the decryption processing is performed using the normal key.

7. An encryption communication apparatus comprising:
(1) a communicating unit for sending and receiving communication data including at least a length field and a data field;
(2) an encryption processing unit for performing encryption processing or decryption processing of data in the data field in the communication data;
(3) a nonvolatile memory for storing a normal key for the encryption processing unit;
(4) a length comparing unit for comparing a value of the length field in the communication data received and a data length of the data field in the said communication data received; and
(5) a controlling unit for controlling to perform the encryption processing or the decryption processing using a dummy key which is obtained by shifting the normal key when it is judged that the value of the length field and the data length of the data field are not identical by comparing in the length comparing unit in order to send a false message to an unauthorized user that the encryption processing or the decryption processing is performed using the normal key.

8. An encryption communication apparatus comprising:
(1) a communicating unit for sending and receiving communication data including at least a data field;
(2) an encryption processing unit for performing encryption processing or decryption processing of data in the data field in the communication data;
(3) a nonvolatile memory for storing a normal key for the encryption processing unit; and
(4) a controlling unit for controlling to perform the encryption processing or the decryption processing using a dummy key which is obtained by shifting the normal key when false data are detected in order to send a false message to an unauthorized user that the encryption processing or the decryption processing is performed using the normal key.

9. The encryption communication apparatus according to claim 6-8, further comprising a key switching unit for switching a key used in the encryption processing unit, wherein the controlling unit controls to perform the encryption processing or decryption processing by switching the key switching unit to the dummy key which is different from the normal key.

10. The encryption communication apparatus according to claim 6-8, further comprising a random number generating unit for generating a random number, wherein the controlling unit uses the random number generated by the random number generating unit as the dummy key.

11. The encryption communication apparatus according to claim 1 or 6, wherein the communication data include a command field, wherein the said length comparing unit specifies the minimum length value based on the value of the command field in the communication data.

12. The encryption communication apparatus according to claim 1 or 6, wherein the length comparing unit specifies the minimum length value based on transaction order of the communication data.

* * * * *